(12) United States Patent
Iyer et al.

(10) Patent No.: US 11,685,324 B2
(45) Date of Patent: Jun. 27, 2023

(54) MEMBER FOR RATCHETING BETWEEN A MOVING COMPONENT AND ADJACENT STRUCTURE

(71) Applicant: Atieva, Inc., Newark, CA (US)

(72) Inventors: Vijay Shankar Authimoolam Iyer, Fremont, CA (US); Tobias Emanuel Monteiro Martins, Fremont, CA (US); Boon-Sam Tan, Fremont, CA (US); Eric Magnus Bach, Newark, CA (US)

(73) Assignee: Atieva, Inc., Newark, CA (US)

( * ) Notice: Subject to any disclaimer, the term of this patent is extended or adjusted under 35 U.S.C. 154(b) by 226 days.

(21) Appl. No.: 16/948,847

(22) Filed: Oct. 2, 2020

(65) Prior Publication Data
US 2022/0105887 A1   Apr. 7, 2022

(51) Int. Cl.
*B60R 19/26*   (2006.01)
*B60R 19/18*   (2006.01)

(52) U.S. Cl.
CPC .............. *B60R 19/26* (2013.01); *B60R 19/18* (2013.01); *B60R 2019/1806* (2013.01); *B60R 2019/1886* (2013.01); *B60R 2019/266* (2013.01)

(58) Field of Classification Search
USPC ............................ 296/187.09; 293/132, 133
See application file for complete search history.

(56) References Cited

U.S. PATENT DOCUMENTS

| | | | |
|---|---|---|---|
| 1,140,899 A | 5/1915 | Glasgow | |
| 1,437,945 A | 12/1922 | Mayne-Reade et al. | |
| 4,103,845 A | 8/1978 | Ueda | |
| 4,518,183 A * | 5/1985 | Lee | B60R 19/40 293/118 |
| 9,746,013 B2 | 8/2017 | Talley et al. | |
| 10,173,728 B2 * | 1/2019 | Munjurulimana | B62D 25/082 |
| 11,046,270 B1 * | 6/2021 | Faruque | B60R 19/20 |
| 2017/0057556 A1 | 3/2017 | Vollmer | |
| 2019/0210779 A1 | 7/2019 | Vaverka | |
| 2019/0249461 A1 | 8/2019 | Herskovitz | |

FOREIGN PATENT DOCUMENTS

| | | |
|---|---|---|
| FR | 2912098 B1 | 5/2009 |
| KR | 10-0251842 B1 | 5/2000 |

OTHER PUBLICATIONS

International Search Report and Written Opinion for PCT Application PCT/US/2021/071674, dated Dec. 23, 2021, 8 pages.

* cited by examiner

*Primary Examiner* — Joseph D. Pape
(74) *Attorney, Agent, or Firm* — Brake Hughes Bellermann LLP

(57) ABSTRACT

A vehicle comprises: a vehicle body having a front and a rear; a vehicle chassis supporting the vehicle body, the vehicle chassis including a chassis portion; a component attached to the front of the vehicle body; and a member comprising (i) an elongate portion having teeth, and (ii) an attachment portion attaching the member to one of the chassis portion or the component, wherein the member is configured for ratcheting of the teeth against an edge of the other of the chassis portion or the component due to relative movement between the component and the chassis portion.

20 Claims, 8 Drawing Sheets
(1 of 8 Drawing Sheet(s) Filed in Color)

MEMBER FOR RATCHETING BETWEEN A MOVING COMPONENT AND ADJACENT STRUCTURE

TECHNICAL FIELD

This document relates to a member for ratcheting between a moving component and adjacent structure.

BACKGROUND

While improvements in automotive technology continue to be made, occasional collisions between vehicles and pedestrians remain a fact of transportation in today's societies. Modern vehicles are designed in part to provide a desired performance in pedestrian collisions. Achieving a better performance in this regard translates into fewer or less severe injuries for the pedestrian. In many countries or regions, testing is performed to rate the vehicle's performance according to certain criteria.

SUMMARY

In a first aspect, a vehicle comprises: a vehicle body having a front and a rear; a vehicle chassis supporting the vehicle body, the vehicle chassis including a chassis portion; a component attached to the front of the vehicle body; and a member comprising (i) an elongate portion having teeth, and (ii) an attachment portion attaching the member to one of the chassis portion or the component, wherein the member is configured for ratcheting of the teeth against an edge of the other of the chassis portion or the component due to relative movement between the component and the chassis portion.

Implementations can include any or all of the following features. The component is a support bracket. The vehicle further comprises fascia, the fascia supported by the support bracket. The support bracket is positioned higher in the vehicle than the chassis portion. The chassis portion comprises a bumper beam. The vehicle further comprises a lighting component that forms an upper leading edge in the front of the vehicle body, the lighting component positioned higher in the vehicle than the component and further forward in the vehicle than the component. The vehicle further comprises a nose portion that forms a lower leading edge in the front of the vehicle body, the nose portion positioned lower in the vehicle than the component and further forward in the vehicle than the component. The teeth are positioned in a first portion of the elongate portion, and wherein a second portion of the elongate portion adjacent the first portion is free of teeth. The member further comprises a bridge portion extending substantially perpendicularly from the elongate portion. The attachment portion extends substantially perpendicularly from the bridge portion on a same side of the bridge portion as the elongate portion. The teeth are oriented in a direction away from the attachment portion. The member is attached to the component, wherein the component includes openings facing each other, and wherein opposing ends of the attachment portion are configured for being received in the respective openings. The vehicle comprises multiple members, each of the multiple members having a respective elongate portion and a respective attachment portion. The multiple members are positioned symmetrically about a longitudinal centerline of the vehicle.

In a second aspect, a member comprises: an elongate portion having teeth; a bridge portion extending substantially perpendicularly from the elongate portion; and an attachment portion extending substantially perpendicularly from the bridge portion on a same side of the bridge portion as the elongate portion, with the teeth oriented in a direction away from the attachment portion.

Implementations can include any or all of the following features. The teeth include at least three teeth, and wherein the teeth are spaced equidistantly from each other on the elongate portion. The elongate portion extends between a first end at the bridge portion and a second end opposite the first end, wherein the elongate portion includes a portion free of teeth, and wherein the portion free of teeth is positioned adjacent the first end and is longer than a spacing between the teeth. The member further comprises a spacer extending from the attachment portion in a direction away from the elongate portion. The member further comprises multiple spacers extending from the attachment portion in a common direction away from the elongate portion.

In a third aspect, a vehicle comprises: a vehicle body having a front and a rear; a vehicle chassis supporting the vehicle body, the vehicle chassis including a chassis portion; a component attached to the front of the vehicle body; and means, attached to one of the chassis portion or the component, for ratcheting against an edge of the other of the chassis portion or the component due to relative movement between the component and the chassis portion.

BRIEF DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

Figure 1:
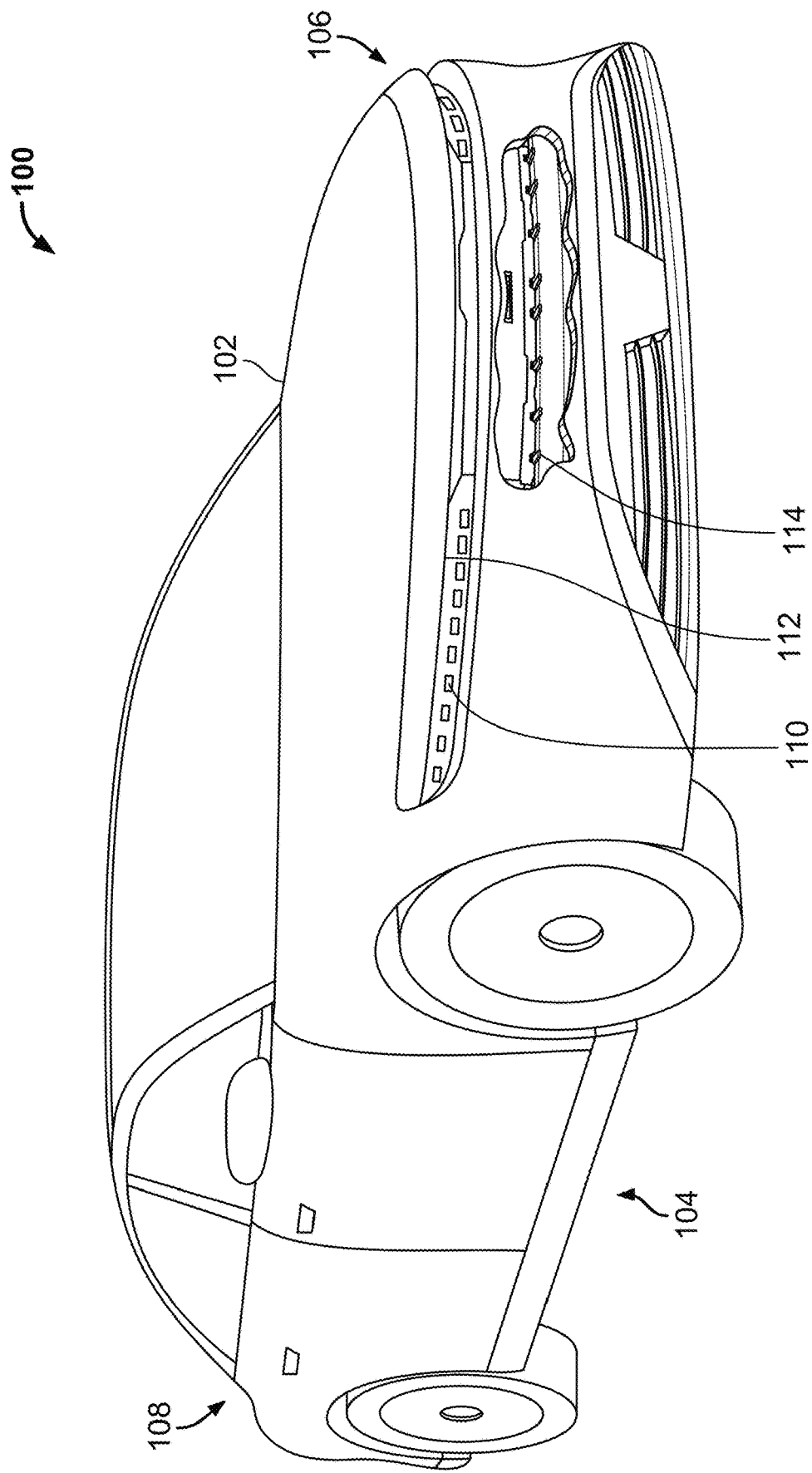
FIG. 1 shows an example of a vehicle.

This document describes examples of systems and techniques for providing better performance in a collision between a vehicle and a pedestrian. In some implementations, a member provides ratcheting between a moving component and adjacent structure as part of the deformation that may follow from the impact. The design of the member can seek to confine the component to one-way travel rearward in the vehicle as a result of the impact. For example, this can prevent or lessen forward travel (e.g., bouncing) of the component relative to the vehicle body. This can improve accident performance, for example by reducing or eliminating the bending of the pedestrian's leg in the collision.

Multiple different vehicle designs can provide improved collision performance, and the following are example characterizations of an aspect of improvement. In some implementations, the side profile of a vehicle's front end can feature a relatively low structure (sometimes referred to as an early pusher) at the pedestrian's lower tibia (shinbone); a compliant middle portion designed to absorb energy; and a relatively highly elevated structure that is positioned slightly rearward of a bumper and fascia. For example, the compliant middle portion can help enforce a deformation mode that offers more resistance against traveling back to its original position after impact.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle.

Examples herein refer to a vehicle chassis. A vehicle chassis is a framework that bears the load of the rest of the vehicle. A vehicle chassis can include one or more frames, which can be made of steel, aluminum alloy, or another stiff and strong material. For example, a vehicle chassis is sometimes made of at least two side rails connected by multiple cross members for structural integrity. One or more other components, including, but not limited to, a battery pack for an electric or hybrid vehicle, can be integrated into or otherwise combined with a vehicle chassis. One or both ends (e.g., the front end) of the vehicle can be provided with a bumper beam which can extend generally transversely to the direction of travel and can be an outermost part of the vehicle chassis. For example, a bumper beam can be designed to absorb impact energy and help distribute crash forces within the vehicle. Another portion of a vehicle chassis is a front end module that can be mechanically attached to a rail or other part of a frame, and can be used for positioning one or more subcomponents. A subframe is a chassis portion that can carry certain components, including but not limited to, a motor, drivetrain, or suspension, to spread chassis loads and/or isolate vibrations and harshness.

Examples herein refer to a vehicle body. A vehicle body is the main supporting structure of a vehicle to which components and subcomponents are attached. In vehicles having unibody construction, the vehicle body and the vehicle chassis are integrated into each other. As used herein, a vehicle chassis is described as supporting the vehicle body also when the vehicle body is an integral part of the vehicle chassis. The vehicle body often includes a passenger compartment with room for one or more occupants; one or more trunks or other storage compartments for cargo; and various panels and other closures providing protective and/or decorative cover.

Examples herein refer to ratcheting. Ratcheting is an interaction of mechanical devices to allow linear or rotary motion in only one direction while preventing motion in the opposite direction. Ratcheting can be provided by engagement between one or more teeth and one or more edges, such as a surface on a pawl. A tooth can have a sloped leading edge to facilitate relative movement between the tooth and the edge during motion in the permitted direction. For example, biasing (such as spring loading) of at least one of the tooth and the edge towards each other can be provided for better engagement.

FIG. 1 shows an example of a vehicle 100. The vehicle 100 can be used with one or more other examples described elsewhere herein. The vehicle 100 includes a vehicle body 102 and a vehicle chassis 104 supporting the vehicle body 102. For example, the vehicle body 102 is here of a four-door type with room for at least four occupants, and the vehicle chassis 104 has four wheels. Other numbers of doors, types of vehicle body 102, and/or kinds of vehicle chassis 104 can be used in some implementations.

The vehicle body 102 has a front 106 and a rear 108. The vehicle 100 can have at least one motor, which can be positioned in one or more locations of the vehicle 100. In some implementations, the motor(s) can be mounted generally near the front 106, generally near the rear 108, or both. The vehicle 100 can have at least one lighting component, which can be situated in one or more locations of the vehicle 100. For example, the vehicle 100 can have one or more headlights 110 mounted generally near the front 106. As another example, the vehicle 100 can have one or more nose lights 112, here mounted above the headlights 110, which can be an auxiliary lamp in form of an elongate strip of lighting (e.g., small individual lights) extending substantially across the width of the vehicle 100 at the front 106.

The vehicle 100 can have one or more features designed to provide improved collision performance, particularly when involving a pedestrian. For purposes of illustration, a portion of the front fascia is here cut out to reveal eight instances of a member 114. Each of the members 114 can be mounted inside the vehicle body 102 and not normally visible from the outside. The members 114 can be designed to provide ratcheting that improves the performance of the vehicle 100 upon impact at the front 106. For example, when there is relative movement between a component of the vehicle body 102 and adjacent structure of the vehicle chassis 104 due to a collision, one or more of the members 114 can ratchet against an edge of the component or the adjacent structure so as to limit or restrict the relative motion (e.g., to confine the movement to a single direction).

Figure 2:
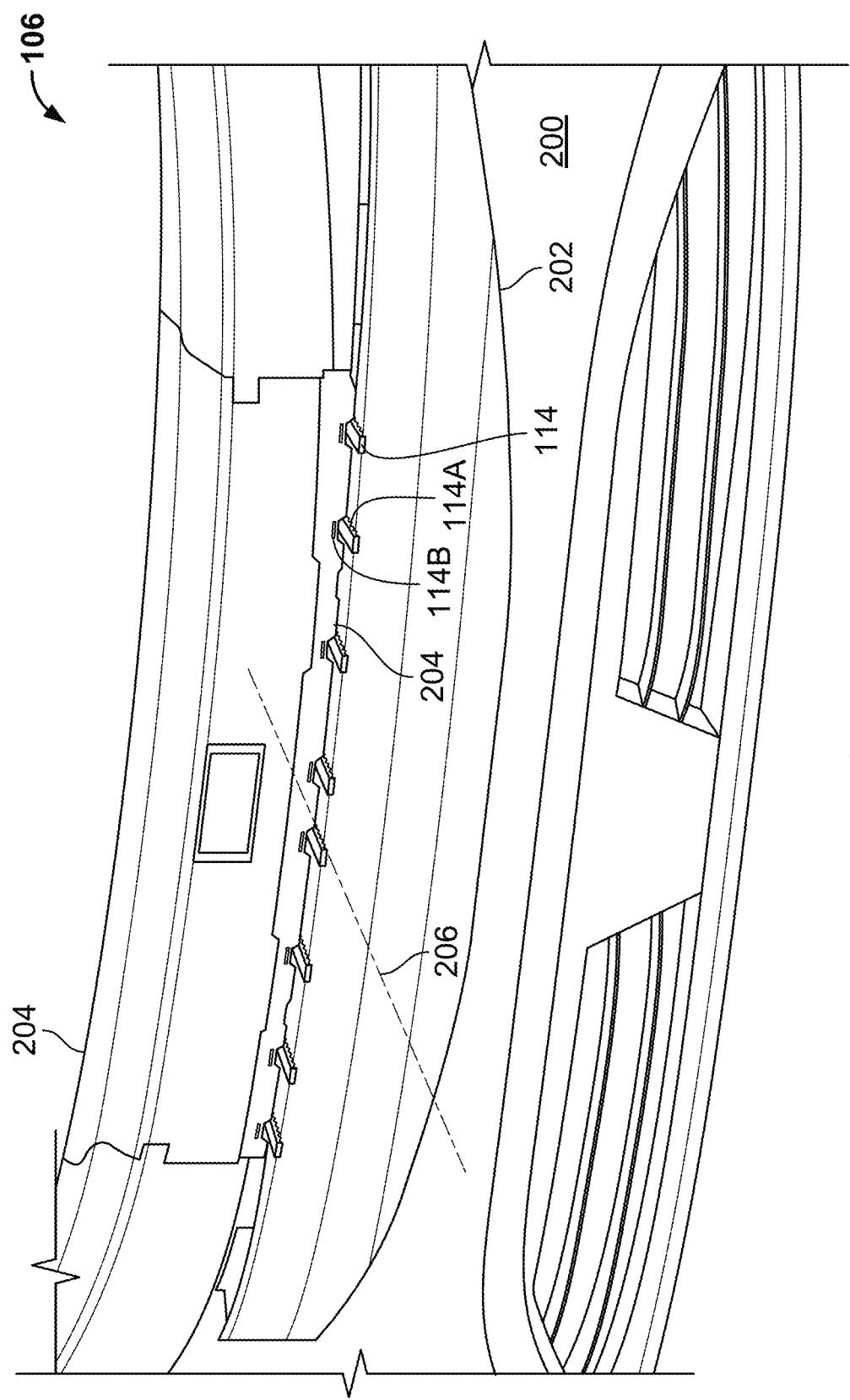
FIG. 2 shows an example of the front of the vehicle in FIG. 1.

FIG. 2 shows an example of the front 106 of the vehicle 100 in FIG. 1. Only portions of the front 106 are shown for clarity. The front 106 can be used with one or more other examples described elsewhere herein. The front 106 includes fascia 200 that is here shown partially transparent for purposes of illustration. The front 106 includes a bumper beam 202. In some implementations, the bumper beam 202 is made from a functionally stiff material to form a portion of the chassis of the vehicle. For example, the bumper beam 202 is configured for absorbing impact energy and distributing crash forces.

The front 106 includes a support bracket 204. In some implementations, the support bracket 204 supports at least the fascia 200 and can be covered by the fascia 200 after assembly. For example, the support bracket 204 can be attached to, or considered part of, the body of the vehicle. The support bracket 204 can include various shaped portions, openings, and/or other structural features to facilitate supporting the fascia 200 (and/or optionally, another component) and attachment of the support bracket 204 to the vehicle.

The front 106 includes the members 114 positioned adjacent the support bracket 204 and the bumper beam 202. Each of the members 114 includes an elongate portion having teeth 114A. In the illustrated example, each of the members 114 is attached to the support bracket 204 by way of an attachment portion 114B, and is configured for at least its teeth 114A to engage with an edge of the bumper beam 202. For example, this can facilitate ratcheting so as to limit or restrict relative motion between the support bracket 204 and the bumper beam 202. In some implementations, one or more of the members 114 is instead attached to the bumper beam 202 so that at least its teeth 114A can engage with an edge of the support bracket 204.

A longitudinal centerline 206 can be defined for the vehicle. The longitudinal centerline 206 can represent the middle of the vehicle in the direction of travel and can correspond to coordinates having y=0 in a vehicle coordinate system. The members 114 can be positioned symmetrically about the longitudinal centerline 206. For example, here four of the members 114 are positioned on one side of the longitudinal centerline 206 (e.g., with positive y values) and the other four of the members 114 are positioned on the other side of the longitudinal centerline 206 (e.g., with negative y values).

Figure 3:
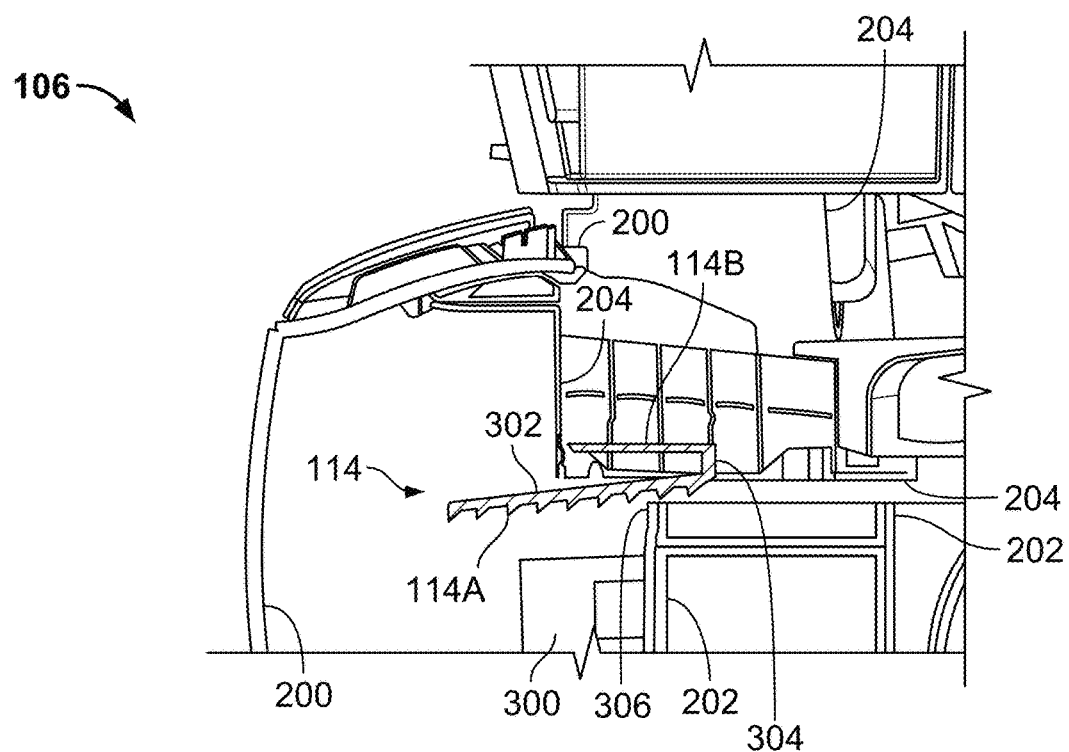
FIG. 3 shows an example cross section of the front of the vehicle in FIG. 1.

FIG. 3 shows an example cross section of the front 106 of the vehicle in FIG. 1. At least partially visible in this view are the fascia 200 supported by the support bracket 204; a foam 300 positioned against the bumper beam 202; and the member 114. Here, the support bracket 204 is positioned higher in the vehicle than the bumper beam 202.

The member 114 includes an elongate portion 302 having the teeth 114A. The member 114 also includes the attachment portion 114B and a bridge portion 304. In some implementations, the attachment portion 114B extends substantially perpendicularly from the bridge portion 304. For example, the attachment portion 114B can extend on a same side of the bridge portion 304 as the elongate portion 302. In some implementations, the teeth 114A can be oriented in a direction away from the attachment portion 114B.

Here, the bumper beam 202 has an edge 306. In some implementations, the edge 306 is formed by the termination of a panel of the bumper beam 202 in a direction that faces the support bracket 204. For example, this panel can be situated at the foremost part of the bumper beam 202 relative to the vehicle. The edge 306 can extend along an entire length or width of the bumper beam 202 or along only a portion thereof. The member 114 is configured so that the teeth 114A can ratchet against the edge 306 due to relative movement between the support bracket 204 (i.e., a component of the vehicle body) and the bumper beam 202 (i.e., a portion of the vehicle chassis). In some implementations, each of the teeth 114A can have a substantially triangular profile. For example, one side of the triangular profile can correspond to the intersection between the tooth 114A and the elongate portion 302. A second side of the triangular profile can form a face that temporarily engages with the edge 306 during movement in one direction (e.g., toward the right in the present illustration). A third side of the triangular profile can form a face that engages with the edge 306 after the movement stops, to prevent movement in the opposite direction (e.g., toward the left in the present illustration).

With reference again briefly to FIGS. 1, 2, and 3, the above examples illustrate that a vehicle (e.g., the vehicle 100) can include a vehicle body (e.g., the vehicle body 102) having a front (e.g., the front 106) and a rear (e.g., the rear 108). The vehicle can include a chassis (e.g., the vehicle chassis 104) supporting the vehicle body, the vehicle chassis including a chassis portion (e.g., the bumper beam 202). The vehicle includes a component (e.g., the support bracket 204) attached to the front of the vehicle body. The vehicle includes a member (e.g., the member 114) comprising an elongate portion (e.g., the elongate portion 302) having teeth (e.g., the teeth 114A), and an attachment portion (e.g., the attachment portion 114B) attaching the member to one of the chassis portion or the component. The member is configured for ratcheting of the teeth against an edge (e.g., the edge 306) of the other of the chassis portion or the component due to relative movement between the component and the vehicle chassis.

Figure 4:
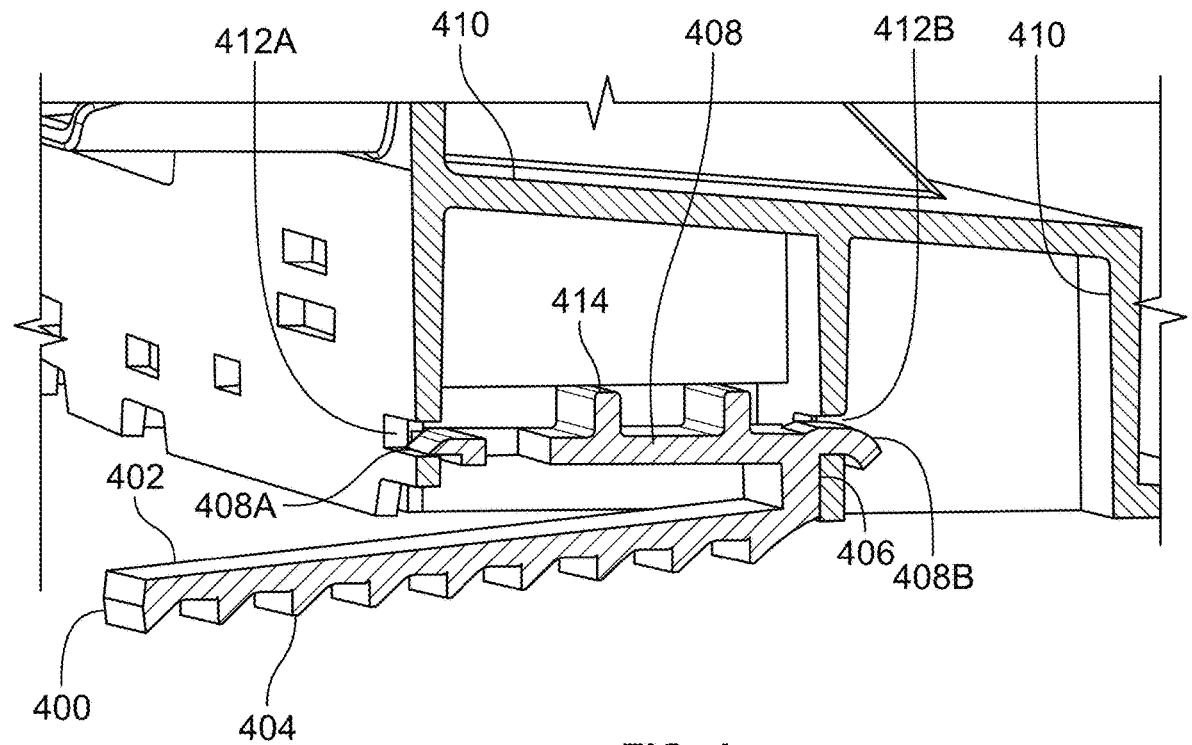
FIG. 4 shows another example of a member.

FIG. 4 shows another example of a member 400. The member 400 is shown in cross-section. The member 400 can be used with one or more other examples described elsewhere herein. The member 400 can be configured for ratcheting against an edge of a chassis portion, or an edge of a vehicle component, due to relative movement between the component and the chassis portion.

The member 400 here includes an elongate portion 402 having teeth 404. The member 400 here includes a bridge portion 406 extending substantially perpendicularly from the elongate portion 402. The member 400 here includes an attachment portion 408 extending substantially perpendicularly from the bridge portion 406 on a same side of the bridge portion 406 as the elongate portion 402. The teeth 404 are oriented in a direction away from the attachment portion 408.

A support bracket 410 is shown in cross-section. The support bracket 410 can support one or more components (not shown) of a vehicle. In this example, the member 400 is attached to the support bracket 410. In some implementations, the support bracket 410 includes openings 412A-412B facing each other. For example, an end 408A of the attachment portion 408 can be configured for being received in the opening 412A. As another example, an end 408B of the attachment portion 408, opposing the end 408A, can be configured for being received in the opening 412B.

The member 400 can include one or more spacers. Here, two spacers 414 are shown. In some implementations, the spacer(s) 414 can be positioned on the attachment portion 408. For example, the spacers 414 can extend in a common direction away from the elongate portion 402. The structure of the member 400 can provide biasing in one or more directions. For example, the present arrangement of at least the elongate portion 402, the bridge portion 406, and the attachment portion 408 can provide biasing of at least the teeth 404 toward an edge (not shown) so as to facilitate ratcheting and limit or restrict relative motion.

Figure 5:
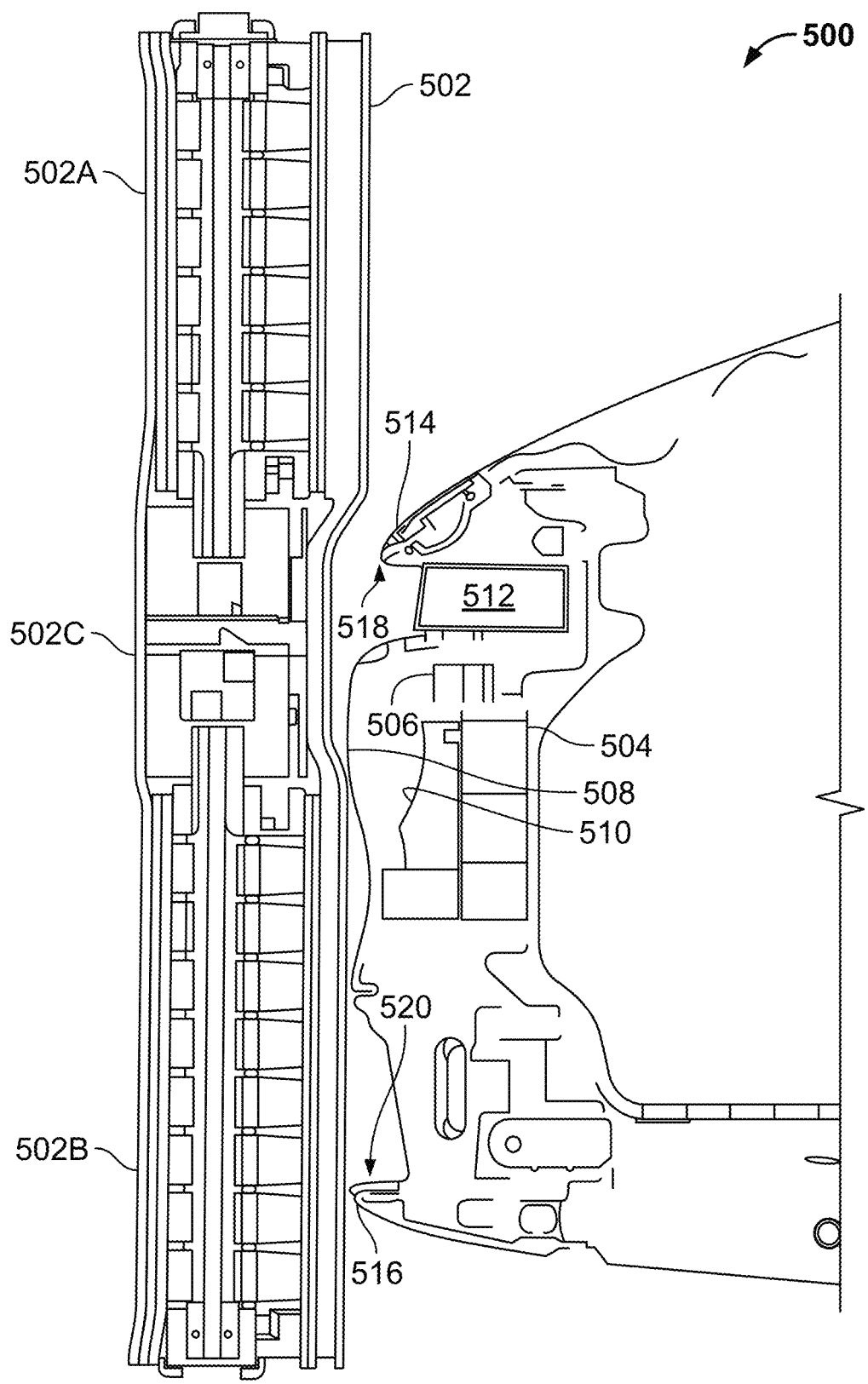
FIG. 5 shows an example cross section of a vehicle front, and a leg model.

FIG. 5 shows an example cross section of a vehicle front 500, and a leg model 502. The vehicle front 500 is here seen from the side, with the rest of the vehicle omitted for simplicity. The leg model 502 includes an upper leg 502A and a lower leg 502B coupled to each other by a knee joint 502C. In some implementations, the leg model 502 can be made from physical components and be equipped with sensors for performing physical testing on the vehicle having the vehicle front 500. In some implementations, the leg model 502 can be electronically defined for performing a computer-based simulation or analysis. For example, a finite-element analysis can be performed based on a digital representation of the leg model 502.

The vehicle front 500 here includes a bumper beam 504; a support bracket 506; fascia 508; foam 510 (e.g., expanded polypropylene); a sensor 512 (e.g., a lidar system occupying a portion of the vehicle front 500); a lighting component 514 (e.g., a nose lamp extending substantially across an entire width of the vehicle front 500); and a nose portion 516 positioned relatively low in the vehicle front 500. The fascia 508 and/or any other of these components can be supported by the support bracket 506. The arrangement of these components in the vehicle front 500 can improve its performance in pedestrian collisions.

In some implementations, the collision performance can be characterized in terms of the respective behaviors of an upper leading edge 518 including at least the lighting component 514, and a lower leading edge 520 including at least the nose portion 516. For example, the upper leading edge 518 can be characterized in that the lighting component 514 is positioned higher in the vehicle than the support bracket 506 and further forward in the vehicle than the support bracket 506. As another example, the lower leading edge 520 can be characterized in that the nose portion 516 is positioned lower in the vehicle than the support bracket 506 and further forward in the vehicle than the support bracket 506. As such, the vehicle front 500 can feature the lower leading edge 520 as an early pusher at the pedestrian's lower tibia; a compliant middle portion including at least the fascia 508 and the foam 510; and the upper leading edge 518 that is positioned slightly rearward of the fascia 508.

Figure 6C:
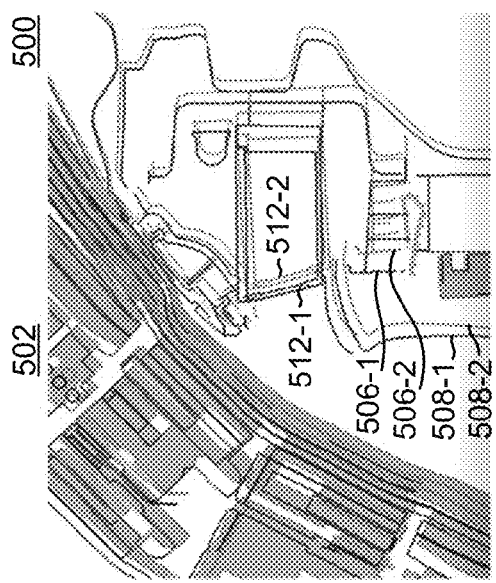
FIGS. 6A-6C show examples of simulations using the vehicle front and the leg model of FIG. 5.
Figure 6B:
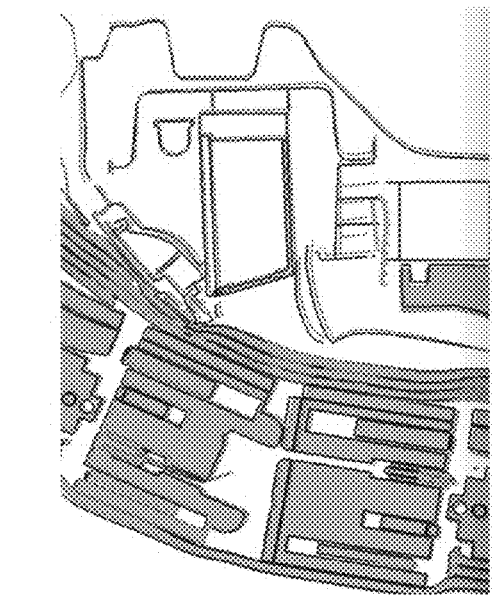
Figure 6A:
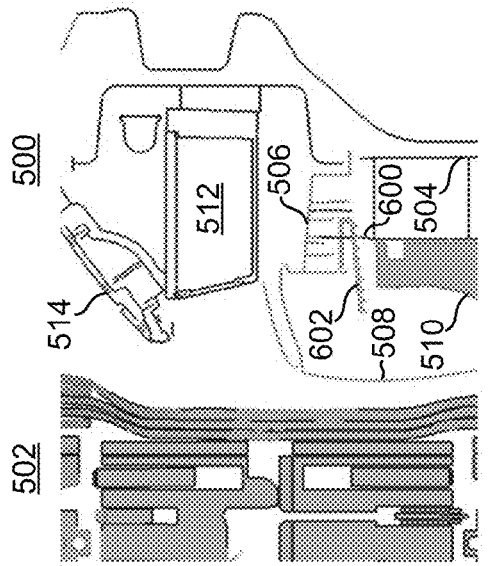

FIGS. 6A-6C show examples of simulations using the vehicle front 500 and the leg model 502 of FIG. 5. Here, only parts of the vehicle front 500 and the leg model 502 are shown for simplicity. Currently visible in the vehicle front 500 are the lighting component 514, the sensor 512, the support bracket 506, the fascia 508, the bumper beam 504 having an edge 600, the foam 510, and a member 602 mounted to the support bracket 506. The member 602 includes an elongate portion having teeth, and an attachment portion attaching the member 602 to the support bracket 506 for ratcheting of the teeth against the edge 600.

The simulations were performed using finite-element analysis in which both the vehicle front 500 and the leg model 502 were defined as computer-based structures. Particularly, two separate simulations of an impact by the vehicle front 500 on the leg model 502 were performed and are both indicated by the present illustrations. In a first simulation the collision was performed without the member 602 being present; in FIGS. 6B-6C, this first simulation is indicated by blue lines in the vehicle front 500. In a second simulation the collision was performed with the member 602 being present as shown in FIG. 6A; in FIGS. 6B-6C, this second simulation is indicated by green lines in the vehicle front 500. In FIG. 6A, on the other hand, the use of blue and green lines in the vehicle front 500 is for illustrative purposes only and is independent of this distinction between the first and second simulations.

FIG. 6A shows the leg model 502 before impact by the vehicle front 500. In the second simulation, the member 602 may not yet have ratcheted against the edge 600. For example, the elongate member may be biased toward the edge 600, and optionally be in contact with the edge 600.

FIG. 6B shows the leg model 502 during the impact by the vehicle front 500. For example, the illustrated instant can represent approximately a half-time of the simulated collision event. In the second simulation, the member 602 has ratcheted against the edge 600 as a result of movement by the fascia 508 and the support bracket 506 toward the right in the illustration. However, a comparison of the blue lines and the green lines indicates that there may yet be only relatively minor differences between the first and second simulations (i.e., without and with the member 602, respectively).

FIG. 6C shows the leg model 502 after the impact by the vehicle front 500. For example, the illustrated instant can represent the state at an end of the simulated collision event. In the first simulation, components of the vehicle body has undergone significant bouncing and as a result have traveled, or continue to travel, in the opposite direction (i.e., toward the left in the illustration). For example, each of the following has moved a substantial difference toward the left: a blue line 508-1 corresponding to the first simulation of the fascia 508; a blue line 506-1 corresponding to the first simulation of the support bracket 506; and a blue line 512-1 corresponding to the first simulation of the sensor 512. These or other occurrences of significant movement in the opposite direction following impact can lead to unwanted consequences with regard to the leg model 502. In some implementations, the leg may be bent more during the collision in the first simulation. For example, this can correspond to a worse collision performance by the vehicle front 500.

In the second simulation shown in FIG. 6C, on the other hand, the member 602 has ratcheted against the edge 600 as indicated by the arrow. This can prevent or reduce the occurrence of unwanted relative movement in the opposite direction. A comparison of the blue lines and the green lines indicates that there may be substantial differences between the first and second simulations (i.e., without and with the member 602, respectively). For example, each of the following has moved substantially less toward the left in the second simulation: a green line 508-2 corresponding to the second simulation of the fascia 508; a green line 506-2 corresponding to the second simulation of the support bracket 506; and a green line 512-2 corresponding to the second simulation of the sensor 512. In the leg model 502, the green areas (corresponding to the second simulation) have moved relatively less away from the vehicle front 500 than have the blue areas (corresponding to the first simulation). In some implementations, the leg may be bent relatively less during the collision in the second simulation. For example, this can correspond to a better collision performance by the vehicle front 500.

Figure 7:
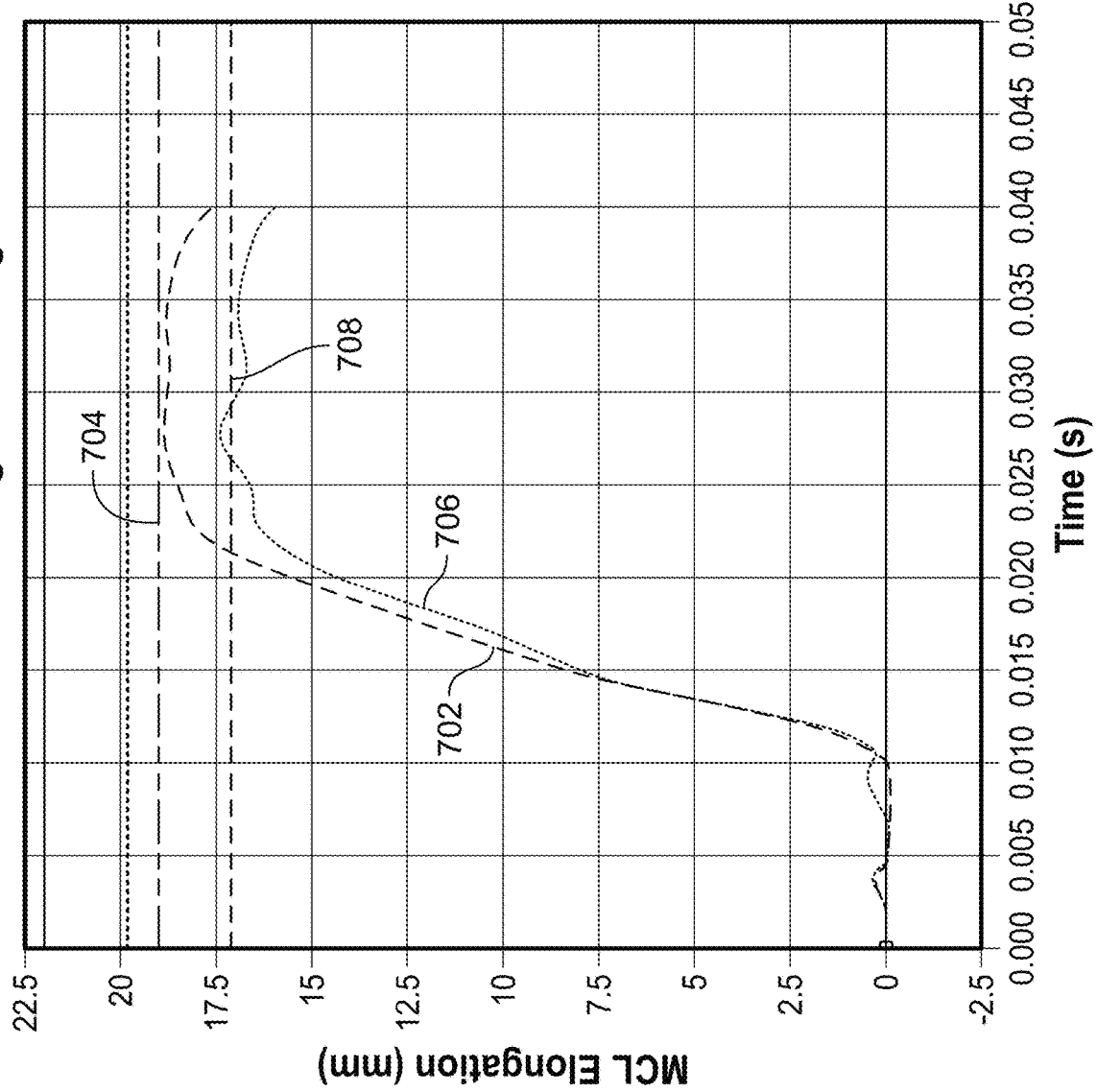
FIG. 7 shows an example graph with simulated medial collateral ligament elongation as a function of time.

FIG. 7 shows an example diagram 700 with simulated medial collateral ligament (MCL) elongation as a function of time. In the diagram 700, the MCL elongation is indicated in millimeters (mm) on the vertical axis, and time is indicated in seconds (s) on the horizontal axis. A graph 702 corresponds to the MCL elongation from a simulated impact that does not use a member as described herein (e.g., corresponding to the first simulation described with reference to FIGS. 6A-6C). For example, the graph 702 almost reaches a value 704 in the diagram 700. A graph 706, on the other hand, corresponds to the MCL elongation from a simulated impact that does use a member as described herein (e.g., corresponding to the second simulation described with reference to FIGS. 6A-6C). For example, the graph 706 essentially stays below a value 708 in the diagram 700, the value 708 being lower than the value 704.

Figure 8:
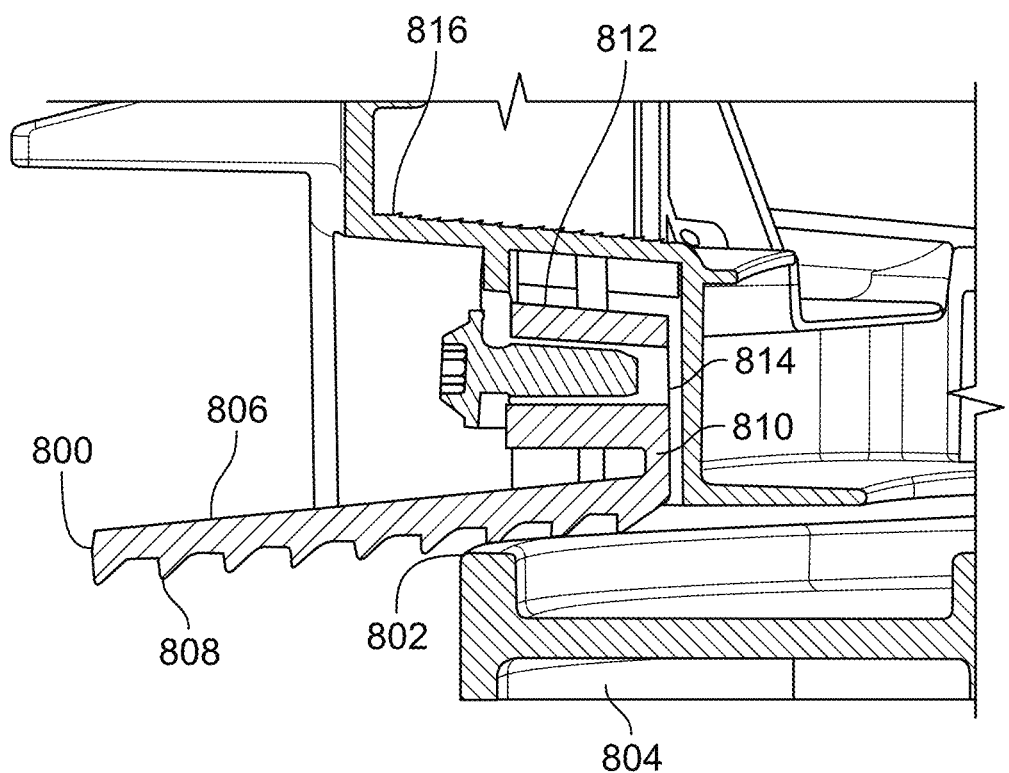
FIG. 8 shows a cross section of another example of a member.

FIG. 8 shows a cross section of another example of a member 800. The member 800 can be used with one or more other examples described elsewhere herein. The member 800 can be configured for ratcheting against an edge 802 of a chassis portion 804, or an edge of a vehicle component (not shown), due to relative movement between the component and the chassis portion. The member 800 here includes an elongate portion 806 having teeth 808. The member 800 here includes a bridge portion 810 extending substantially perpendicularly from the elongate portion 806. The member 800 here includes an attachment portion 812 extending substantially perpendicularly from the bridge portion 810 on a same side of the bridge portion 810 as the elongate portion 806. The teeth 808 are oriented in a direction away from the attachment portion 812. The attachment portion 812 can include at least one opening 814 for attaching the member 800 to a component 816.

Figure 9:
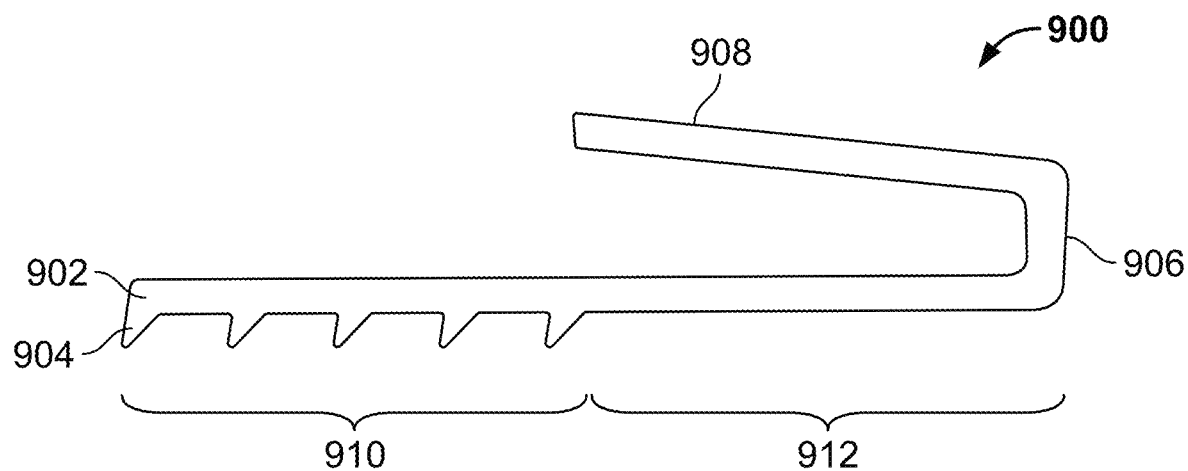
FIG. 9 shows another example of a member.

FIG. 9 shows another example of a member 900. The member 900 can be used with one or more other examples described elsewhere herein. The member 900 can be configured for ratcheting against an edge of a chassis portion (not shown), or an edge of a vehicle component (not shown), due to relative movement between the component and the chassis portion. The member 900 here includes an elongate portion 902 having teeth 904. The member 900 here includes a bridge portion 906 extending substantially perpendicularly from the elongate portion 902. The member 900 here includes an attachment portion 908 extending substantially perpendicularly from the bridge portion 906 on a same side of the bridge portion 906 as the elongate portion 902. The teeth 904 are oriented in a direction away from the attachment portion 908.

One or more areas of the elongate portion 902 can be left free of teeth. Here, the teeth 904 are positioned in a portion 910 of the elongate portion 902. The teeth 904 can be spaced equidistantly from each other on the elongate portion 902 (e.g., assuming the elongate portion 902 includes a row of at least three teeth 904). Moreover, a portion 912 of the elongate portion 902 that is adjacent the portion 910 can be free of teeth. The portion 912 can be longer than a spacing between the teeth 904. The portion 912 can help tune the functionality of the member 900 so as to provide immunity against unwanted ratcheting. In some implementations, the portion 912 can allow a certain amount of relative motion (in either direction) between the member 900 and the edge (not shown) without ratcheting. For example, this can allow some nominal pressure to be applied against the front of a vehicle without the member becoming locked against the edge.

Figure 10:
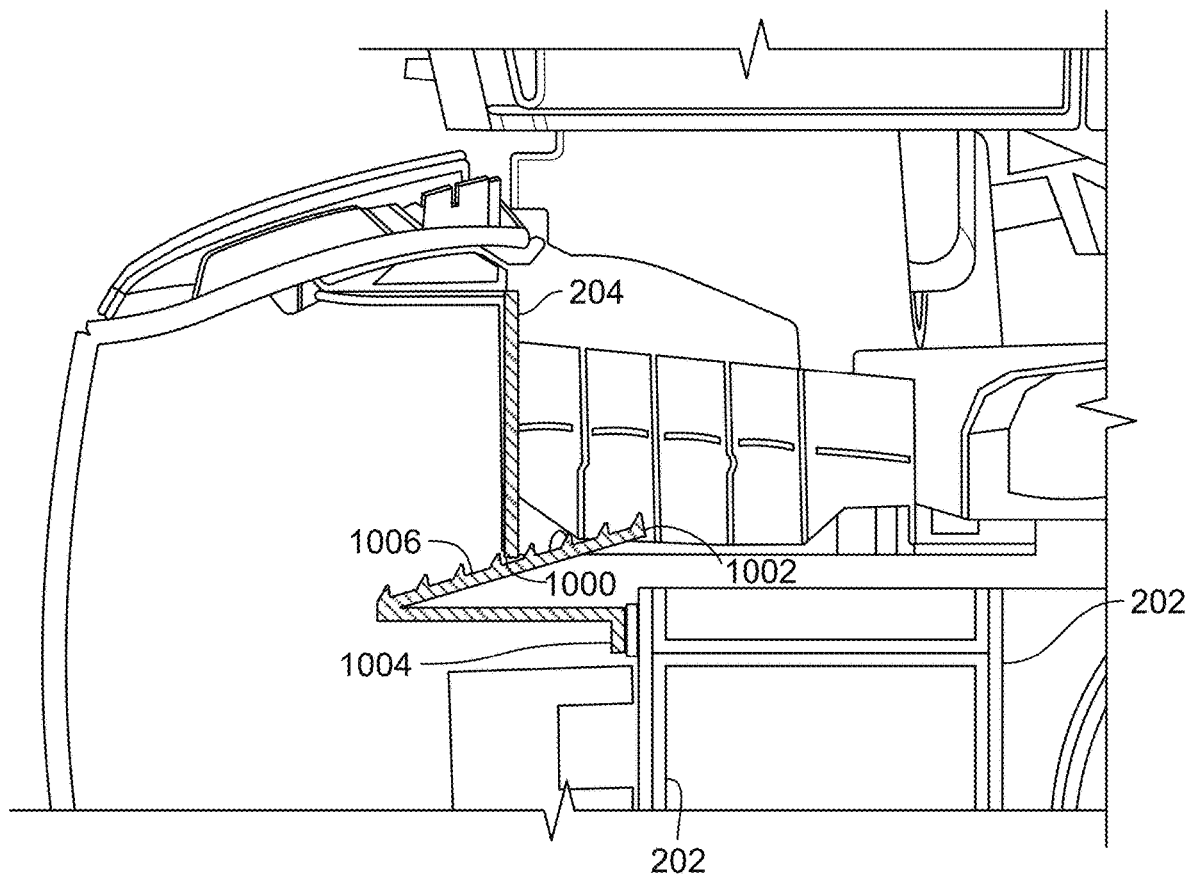
FIG. 10 shows another example of the front in FIG. 3.

FIG. 10 shows another example of the front 106 in FIG. 3. Here, the bumper beam 202 and the support bracket 204 are shown substantially as described above. However, the support bracket 204 here includes an edge 1000 that is situated facing the bumper beam 202. Moreover, a member 1002 is here attached to the bumper beam 202 by way of an attachment portion 1004. The attachment portion 1004 is here substantially perpendicular to an elongate portion 1006 of the member 1002. The member 1002 can be configured for ratcheting against the edge 1000 due to relative movement between the support bracket 204 and the bumper beam 202.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle comprising:
a vehicle body having a front and a rear;
a vehicle chassis supporting the vehicle body, the vehicle chassis including a chassis beam;
a component attached to the front of the vehicle body; and
a member comprising (i) an elongate portion having teeth, and (ii) an attachment portion attaching the member directly to one of the chassis beam or the component, wherein the member is configured for ratcheting of the teeth against an edge of the other of the chassis beam or the component due to relative movement between the component and the chassis beam.

2. The vehicle of claim 1, wherein the component is a support bracket.

3. The vehicle of claim 2, further comprising fascia, the fascia supported by the support bracket.

4. The vehicle of claim 2, wherein the support bracket is positioned higher in the vehicle than the chassis portion.

5. The vehicle of claim 1, wherein the chassis beam comprises a bumper beam.

6. A vehicle comprising:
a vehicle body having a front and a rear;
a vehicle chassis supporting the vehicle body, the vehicle chassis including a chassis portion;
a component attached to the front of the vehicle body;
a member comprising (i) an elongate portion having teeth, and (ii) an attachment portion attaching the member to one of the chassis portion or the component, wherein the member is configured for ratcheting of the teeth against an edge of the other of the chassis portion or the component due to relative movement between the component and the chassis portion; and
a lighting component that forms an upper leading edge in the front of the vehicle body, the lighting component positioned higher in the vehicle than the component and further forward in the vehicle than the component.

7. The vehicle of claim 6, further comprising a nose portion that forms a lower leading edge in the front of the vehicle body, the nose portion positioned lower in the vehicle than the component and further forward in the vehicle than the component.

8. The vehicle of claim 1, wherein the teeth are positioned in a first portion of the elongate portion, and wherein a second portion of the elongate portion adjacent the first portion is free of teeth.

9. A vehicle comprising:
a vehicle body having a front and a rear;
a vehicle chassis supporting the vehicle body, the vehicle chassis including a chassis portion;
a component attached to the front of the vehicle body; and
a member comprising (i) an elongate portion having teeth, and (ii) an attachment portion attaching the member to one of the chassis portion or the component, wherein the member is configured for ratcheting of the teeth against an edge of the other of the chassis portion or the component due to relative movement between the component and the chassis portion;
wherein the member further comprises a bridge portion extending substantially perpendicularly from the elongate portion.

10. The vehicle of claim 9, wherein the attachment portion extends substantially perpendicularly from the bridge portion on a same side of the bridge portion as the elongate portion.

11. The vehicle of claim 10, wherein the teeth are oriented in a direction away from the attachment portion.

12. A vehicle comprising:
a vehicle body having a front and a rear;
a vehicle chassis supporting the vehicle body, the vehicle chassis including a chassis portion;
a component attached to the front of the vehicle body; and
a member comprising (i) an elongate portion having teeth, and (ii) an attachment portion attaching the member to one of the chassis portion or the component, wherein the member is configured for ratcheting of the teeth against an edge of the other of the chassis portion or the component due to relative movement between the component and the chassis portion;
wherein the member is attached to the component, wherein the component includes openings facing each other, and wherein opposing ends of the attachment portion are configured for being received in the respective openings.

13. The vehicle of claim 1, wherein the vehicle comprises multiple members, each of the multiple members having a respective elongate portion and a respective attachment portion.

14. The vehicle of claim 13, wherein the multiple members are positioned symmetrically about a longitudinal centerline of the vehicle.

15. A member comprising:
an elongate portion having teeth;
a bridge portion fixed to, and extending substantially perpendicularly from, the elongate portion; and
an attachment portion fixed to, and extending substantially perpendicularly from, the bridge portion on a same side of the bridge portion as the elongate portion, wherein only the bridge portion connects the elongate portion and the attachment portion to each other, with the teeth oriented in a direction away from the attachment portion.

16. The member of claim 15, wherein the teeth include at least three teeth, and wherein the teeth are spaced equidistantly from each other on the elongate portion.

17. The member of claim 16, wherein the elongate portion extends between a first end at the bridge portion and a second end opposite the first end, wherein the elongate portion includes a portion free of teeth, and wherein the portion free of teeth is positioned adjacent the first end and is longer than a spacing between the teeth.

18. The member of claim 15, further comprising a spacer extending from the attachment portion in a direction away from the elongate portion.

19. The member of claim 18, further comprising multiple spacers extending from the attachment portion in a common direction away from the elongate portion.

20. A vehicle comprising:
a vehicle body having a front and a rear;
a vehicle chassis supporting the vehicle body, the vehicle chassis including a chassis beam;
a component attached to the front of the vehicle body; and
means, directly attached to one of the chassis beam or the component, for ratcheting against an edge of the other of the chassis beam or the component due to relative movement between the component and the chassis beam.

* * * * *